United States Patent [19]

Johnson

[11] 4,243,238
[45] Jan. 6, 1981

[54] SLED

[76] Inventor: Marvin L. Johnson, 4236 Bayberry, Louisville, Ky. 40216

[21] Appl. No.: 924,502

[22] Filed: Jul. 14, 1978

[51] Int. Cl.³ .............................................. B62B 13/08
[52] U.S. Cl. ................................. 280/20; 280/21 R; 280/22
[58] Field of Search ................... 280/20, 22, 15, 12 R; 188/8; 190/43, 57

[56] References Cited
U.S. PATENT DOCUMENTS

| 909,775 | 1/1909 | Ford | 280/12 R |
| 2,673,744 | 3/1954 | Johnson | 280/20 |
| 3,372,944 | 3/1968 | Lauritzen | 280/20 |
| 3,522,952 | 8/1970 | Uttenthaler | 188/8 |
| 3,811,543 | 5/1974 | Parrachia | 190/43 |

Primary Examiner—Robert R. Song
Attorney, Agent, or Firm—Maurice L. Miller, Jr.

[57] ABSTRACT

A bobsled having a load supporting forward steerable member hingably connected to a load supporting trailing member is disclosed wherein the trailing member is spaced behind the forward member. The hinge connected members are adapted to turn and tilt relative to one another for changing the direction of movement of the sled and for folding the members upon one another for ease of handling, transportion and storage. Hand grips located on a front end portion of the forward member permit a rider lying prone on the sled to turn or tilt the same while in motion to alter the direction of motion of the sled or brake the forward momentum thereof. The members each contain a pair of runners having lower surfaces tapered away from a weight-bearing surface of the members as the runners extend from the front to the back of each member. Elongated, flat, rectangular reinforcing strips formed of durable material such as metal are attached to rear portions of the lengths of the sled runners.

9 Claims, 4 Drawing Figures

SLED

BACKGROUND OF THE INVENTION

This invention relates generally to sleds for use on snow or ice and more specifically to foldable, steerable sleds having means for braking the forward momentum thereof.

Foldable bobsleds and toboggans are known to the prior art as indicated by U.S. Pat. No. 3,583,722 issued to I. R. Jacobson on June 8, 1971, and U.S. Pat. No. 3,799,566 issed to M. Thompson on Mar. 26, 1974. However, such prior art structures are not steerable, nor are they fitted with means for braking the forward momentum thereof. On the other hand, steerable sleds are known in the prior art such as those disclosed in U.S. Pat. No. 197,337 issued to T. J. Cope on Nov. 20, 1877 and U.S. Pat. No. 791,820 issued to C. Sattler on June 6, 1905. However, such steerable sleds are neither foldable, nor are they fitted with means for braking their forward momentum.

My invention overcomes these and other difficulties known in the prior art.

SUMMARY OF THE INVENTION

It is an object of my invention to provide a steerable foldable bobsled.

It is another object of my invention to provide a bobsled having means for braking the forward momentum thereof.

Briefly, in accordance with the objects of my invention, there is provided a sled including a load supporting forward steerable member, and a load supporting trailing member spaced behind the forward member. Means is provided for hingably connecting the forward and trailing members together for turning the members relative to one another in a horizontal plane, and for tilting the members relative to one another in a vertical plane.

Additional objects, features and advantages of my invention will become apparent to those skilled in the art from the following detailed description and attached drawings upon which, by way of example, only a preferred embodiment of the subject invention is illustrated.

DESCRIPTION OF THE PREFERRED EMBODIMENT

Figure 1:
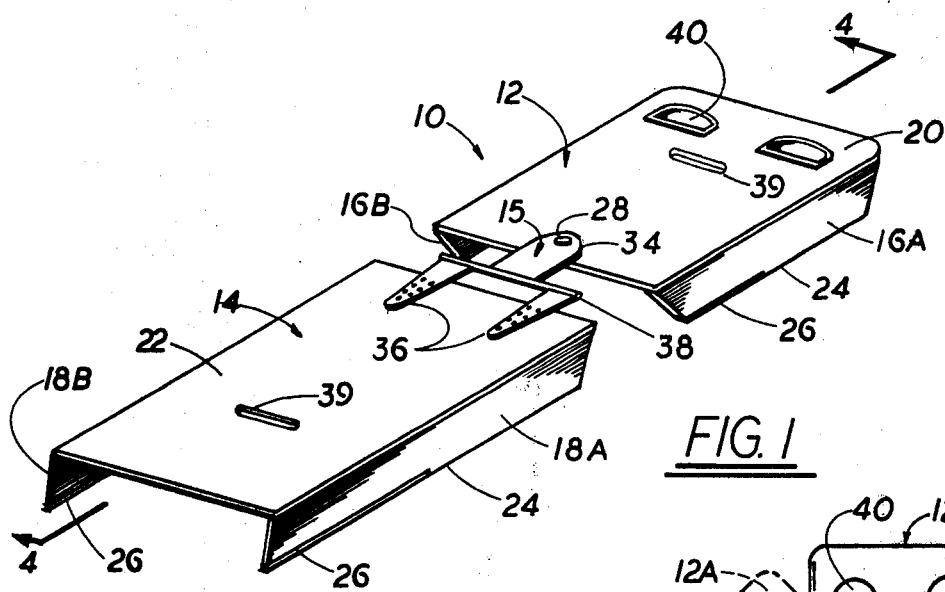
FIG. 1 shows an oblique projection of a bobsled, illustrating one preferred embodiment of my invention.

Referring now to the drawings there is shown, in one preferred embodiment of my invention, a bobsled 10 including a forward steerable member 12 and a trailing member 14 joined together by means of a hinge assembly 15.

Figure 4:
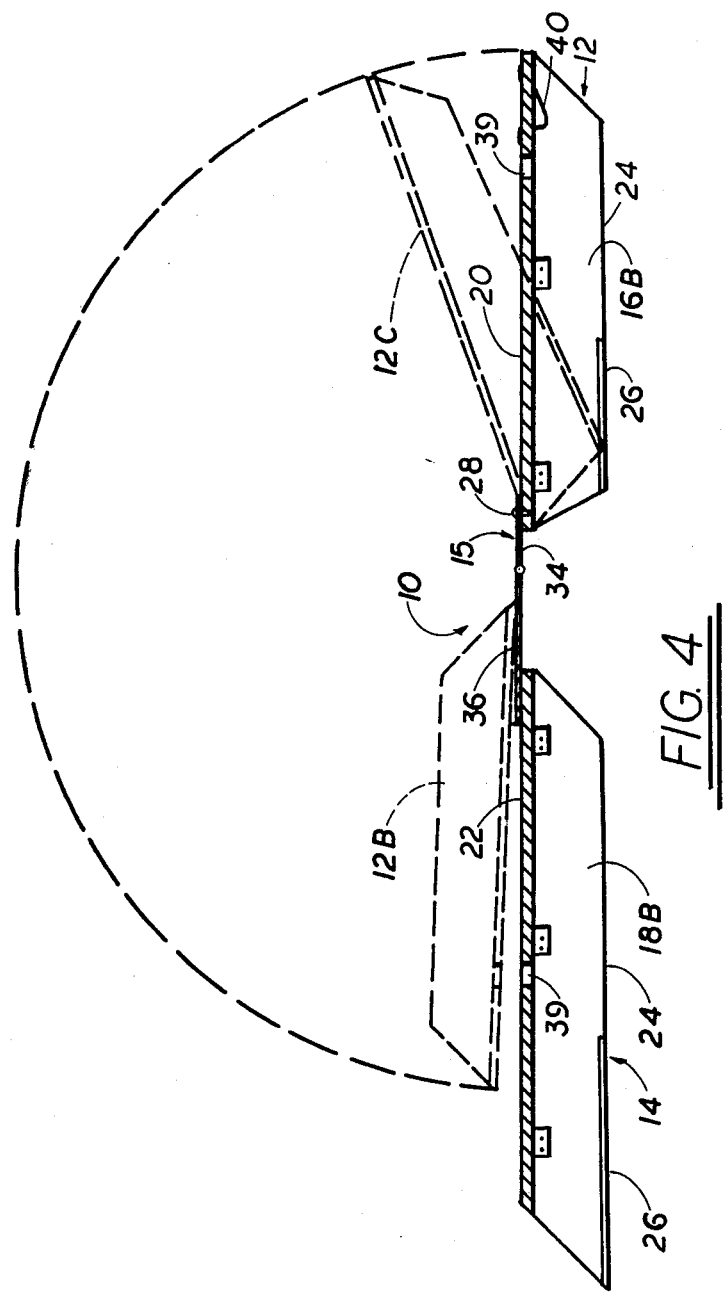
FIG. 4 shows a cross-sectional side elevational view of the bobsled of FIG. 1 as viewed along lines 4—4 of the latter figure.

The members 12, 14 each contain a pair of runners 16a, b and 18a, b secured along opposite side edge portions of a pair of flat plates 20, 22, respectively. The runners 16, 18 and plates 20, 22 may be constructed of any suitable material such as, for example, wood, plastic or metal, or a combination of the foregoing. The runners 16, 18 are slightly tapered along bottom surfaces 24 thereof away from the bottom of the plates 20, 22 as their lengths progress from the front to the rear of the members 12, 14, respectively, as shown in exaggerated form in FIG. 4 for illustrative purposes. A series of elongated, flat, rectangular reinforcing members 26, which may be constructed of a durable material such as metal, are attached along notched rear portions of each of the tapered surfaces 24 so as to extend from the rear end of each of the runners 16, 18 forwardly along a portion of the lengths thereof. Since the runners 16, 18 are tapered, most of the weight borne by the plates 20, 22 will be transferred to rear portions of the lengths of the surfaces 24, especially during the process of braking the forward momentum of the sled 10 as later explained. Accordingly, I recommend that the reinforcing members 26 be constructed so as to extend at least one-fourth of the length of the runner surfaces 24, although the exact length of their extension is a matter of choice. The taper of the surfaces 24 may be relatively gradual such as, for example, one inch rise in a 24 inch run.

Figure 2:
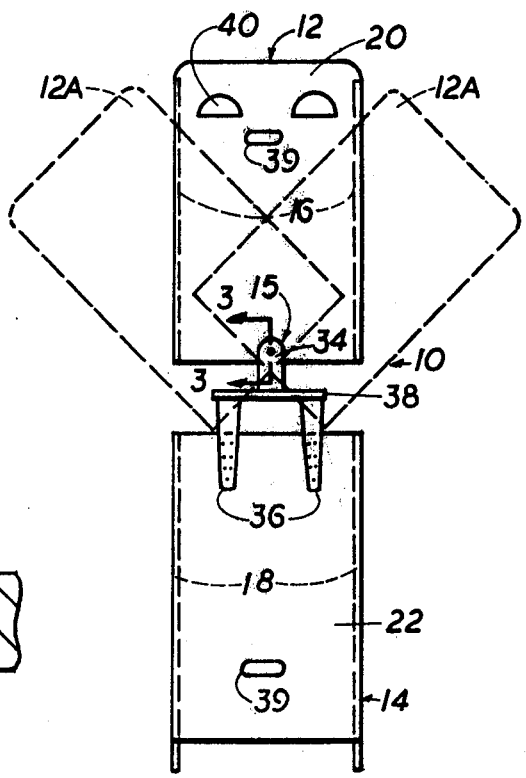
FIG. 2 shows a plan view of the bobsled of FIG. 1.
Figure 3:
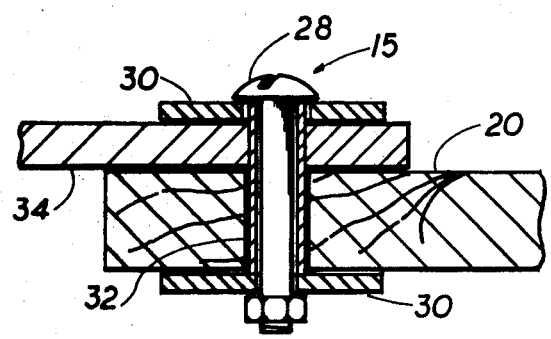
FIG. 3 shows a cross-sectional elevational view of a portion of the bobsled of FIG. 2 as viewed along lines 3—3 of the latter figure.

The hinge assembly 15 joins the members 12, 14 together so as to permit the forward member 12 to turn to the right or left in the horizontal plane relative to the trailing member 14 as illustrated in FIG. 2 by means of dashed lines 12A. This steerable feature is accomplished in part by spacing the rear end of the forward member 12 from the front end of the trailing member 14 a distance sufficient to obtain the desired angular displacement between members 12, 14. The assembly 15 is rotated in the horizontal plane about a hinge pin 28 inserted through a pair of washers 30, a cylindrical sleeve 32, a tongue 34, and the plate 20 (See FIG. 3). The assembly 15 is also hingable in the vertical plane by means of a pair of hinge tongues 36 attached to the plate 22. The tongues 36 are connected in the usual, well known manner to an elongated hinge joint 38, to which the tongue 34 is also connected. Thus, the members 12, 14 may be folded upon themselves for convenient shipping, storage or handling as illustrated by the dashed lines 12B in FIG. 4. A pair of elongated slots 39 are located along the centerline of the length of the sled 10 on the plates 20, 22 so as to register with one another when the members 12, 14 are collapsed upon themselves. The folded unit may then be hand carried by inserting the hand through both of the registered slots 39.

The vertical hingable feature of the assembly 15 also permits a sled rider to brake the forward momentum of the sled 10. This is accomplished by the rider lying prone across the plates 20, 22 so that a pair of sunken hand grips 40 can be manually manipulated. By pulling rearwardly and evenly on the hand grips 40, the rider can lift the front end of the member 12 slightly, as shown in exaggeration at 12C in FIG. 4, whereby a rear portion of the reinforcing members 26 on the forward member 12 digs into the ice or snow to slow the forward momentum of the sled 10. To steer the sled 10, the rider pulls rearwardly on a selected one of the two hand grips 40 to turn the member 12 in the desired direction.

The double hinge arrangement of the tongues 36 in the subject example is recommended for sleds whose widths are on the order of 24 inches or more. For sleds of lesser width, a single tongue arrangement for connecting the trailing member 14 to the hinge pin 38 may be found to be sufficient.

Although the present invention has been described with respect to specific details of a certain preferred embodiment thereof, it is not intended that such details limit the scope of the present invention otherwise than as set forth in the following claims.

I claim:

1. A sled comprising
a load supporting forward steerable member,
a load supporting trailing member spaced behind said forward member,
means hingably connecting said forward and trailing members together for turning said members relative to one another in a horizontal plane and for tilting said members relative to one another in a vertical plane,
hand gripping means connected to said forward member for selectively turning and tilting said members relative to one another for respectively altering the direction of movement of said sled for braking the momentum thereof, and
runners formed on opposite side edge portions of said forward and trailing members having bottom surfaces tapered away from a weight supporting surface of each of said members as said surfaces extend from the front to the rear of said runners.

2. The sled of claim 1 further comprising a reinforcing member attached to each of said runners and disposed in a notch defined in the bottom surfaces thereof, said reinforcing members extending along a rear portion of the length of said runners.

3. The sled of claim 1 wherein said hingably connecting means is adapted for folding said plates upon one another, said sled further comprising a pair of slot defining portions on said plates disposed so as to register with one another when said plates are folded upon themselves, whereby a hand can be inserted through both plates for gripping and carrying the same.

4. A sled comprising
a forward steerable member,
a trailing member spaced behind said forward member,
hinge means connecting said forward and trailing members together for altering the direction of movement of said sled and for braking the momentum thereof, said means being adapted for folding said members upon one another,
a pair of slot defining portions on said members disposed so as to register with one another when said members are folded upon themselves, whereby a hand can be inserted through both members for gripping and carrying the same, and
runners formed on opposite side edge portions of said forward and trailing members having bottom surfaces tapered away from a weight supporting surface of each of said members as said surface extends from the front to the rear of said runners.

5. A sled comprising
a forward weight supporting plate,
a trailing weight supporting plate,
means connecting said forward and trailing plates together, and runners connected to opposite side portions of said plates and having bottom surfaces tapered away from said plates as said runners extend from front portions of said plates toward rear portions of said plates.

6. The sled of claim 5 further comprising elongated reinforcing members connected along rear portions of the lengths of said surfaces.

7. The sled of claim 5 wherein said means comprises a hinge assembly for turning said plates relative to one another in a plane containing said plates.

8. The sled of claim 5 wherein said means comprises a hinge assembly for folding said plates upon one another.

9. The sled of claim 8 further comprising a pair of slot defining portions on said plates disposed so as to register with one another when said plates are folded upon themselves, whereby a hand can be inserted through both plates for gripping and carrying the same.

* * * * *